(12) United States Patent
Swoboda et al.

(10) Patent No.: US 7,137,494 B2
(45) Date of Patent: Nov. 21, 2006

(54) DEVICE FOR THE CONTACTLESS TRANSFER OF ELECTRICAL ENERGY

(75) Inventors: Werner Swoboda, Boeblingen (DE); Juergen Roeckle, Magstadt (DE)

(73) Assignee: Eisenmann Maschinenbau GmbH & Co. KG (DE)

(*) Notice: Subject to any disclaimer, the term of this patent is extended or adjusted under 35 U.S.C. 154(b) by 18 days.

(21) Appl. No.: 10/961,968

(22) Filed: Oct. 8, 2004

(65) Prior Publication Data
US 2005/0098404 A1    May 12, 2005

(30) Foreign Application Priority Data
Oct. 10, 2003    (DE)    ................. 103 47 851

(51) Int. Cl.
*B60L 9/00*    (2006.01)
(52) U.S. Cl. ....................................... 191/10
(58) Field of Classification Search ........... 191/10, 191/22 R, 29 R, 23 A, 23 R, 45 A
See application file for complete search history.

(56) References Cited

U.S. PATENT DOCUMENTS

| | | | |
|---|---|---|---|
| 5,927,657 A * | 7/1999 | Takasan et al. ............. | 246/194 |
| 6,374,748 B1 * | 4/2002 | Shiwaku et al. ............ | 104/243 |
| 6,543,591 B1 * | 4/2003 | Kuzuya ....................... | 191/10 |

* cited by examiner

*Primary Examiner*—Mark T. Le
(74) *Attorney, Agent, or Firm*—Young Basile

(57) ABSTRACT

A device with which electrical energy can be transferred from a power cable running along a stationary rail of a transport system to a moving element that can be driven along the rail. Each moving element has for this purpose a transfer head which works inductively together with the power cable. The power cable is attached with the aid of carrier profile which extends substantially along the entire length of the rail and is fixed in a releasable manner to the rail, which element has at least one a trough-like holder open to the side in which the power cable is laid. The power cable is thus relatively easily and accurately laid, avoiding hanging loops of cable which could be damaged by abrasion by the passing transfer heads of the moving elements.

11 Claims, 3 Drawing Sheets

DEVICE FOR THE CONTACTLESS TRANSFER OF ELECTRICAL ENERGY

BACKGROUND OF THE INVENTION

The invention relates to a device for the contactless transfer of electrical energy from at least one power cable carrying electrical energy which is laid alongside a stationary rail of a transport system, to a movable element that can be driven along the rail, which element has a transfer head working inductively together with the power cable, with at least one carrier element fixed in a releasable manner to the rail, which element has a holder for the power cable.

Transport systems of the type considered here are known in various embodiments. One prominent example of this are electrically powered suspension railways in which the individual cars suspended from a carrier rail move along the carrier rail driven by a motor. In all these cases, it is necessary to transfer the electrical energy of the moving element required to operate, in particular to drive it, from a stationary power cable laid alongside the rail, to the movable element. In the past, this has mostly been effected by sliding contactors which are fixed to the moving element and which slide along a stationary power rail that is accessible from the outside and which serves as a power cable. The disadvantage is that spark formation cannot always be reliably prevented, which is not acceptable especially in environments at risk from explosions. In addition, dust is generated by the sliding contacts which can also not be tolerated in many fields of application, particularly in painting technology.

For these reasons, there are also transport systems of the above kind in which the electrical operating power is transferred inductively—that is contactlessly—from the stationary power cable to the moving element. In this case, spark formation and contaminating dust are reliably prevented. With these systems, however, there is the question of how the power cable can be laid against the guide rail. In known contactless energy transfer transport systems this is done with the aid of a large number of individual clips which are fixed with elastic mountings onto the rail at intervals of approximately 15 cm. The individual clips have connecting openings through which the power cable has to be "threaded". This "threading" is a task that has to be done by hand and involves considerable expenditure. In addition, loops of the power cable hang down between the individual clips and can under unfavourable conditions make contact with the transfer heads of the passing moving elements and can thus suffer abrasion.

SUMMARY OF THE INVENTION

The object of the present invention is to create a device of the type described above with which it is possible to lay the power cable in a simple and precise manner, avoiding abrasion.

This object is achieved in accordance with the invention in that the carrier element is a carrier profile along substantially the entire rail which has at least one trough-like holder open to the side in which a power cable is laid.

Thus, in accordance with the invention, it does not use a large number of discrete carrier parts locked onto the rail at intervals but rather a string-like carrier profile that can be supplied in linear units. Where this carrier profile is divided for practical reasons into pieces of finite length, these are butted up to each other against the rail so that in the end a continuous carrier profile results. The holder for the power cable is also in this way continuous; there are no interruptions where the power cable could hang down in a loop-like manner. Laying the power cable into the holder requires little effort as it can be inserted into the holder from the open side without "threading" being necessary. The precise guiding of the power cable which is achieved in this manner is also more attractive than that used in the state of the art.

It is expedient for the carrier profile to have two parallel holders in each of which a power cable is laid. This corresponds to the fact that transport systems of the type considered here generally use multi-phase power sources. This means that power cables corresponding to different phases of the multi-phase power source can be laid in the two holders.

The device in accordance with the invention also enables data to be exchanged in a contactless manner between a databus stretching along the stationary rail and the moving element. An embodiment in which the carrier profile has at least one trough-like holder in which a data bus is laid serves this purpose. The advantages of laying this data bus are exactly the same as described above for the power cable.

The recesses can be arranged at the end of an arm which projects from a central strip of the carrier profile. In this way, the transfer head can overlap the power cable or data bus from above, from below or around it and thus guarantee a good energy connection.

The arm can have two parallel legs which are connected with each other through the holder on the edge facing away from the central strip. This configuration of the invention uses few materials and makes it possible to make the arm more or less flexible according to requirements.

If, as is the case in a preferred embodiment of the invention, the legs of an arm have projections running parallel with the longitudinal direction of the carrier profile, this can guarantee a particular degree of flexibility in the legs around a defined rotation axis, which can be helpful where the carrier profile has an elastic mounting on the rail.

For the same reason, it is possible to not directly connect the edges of an arm which are adjacent to the central strip of the carrier profile. The two legs of the arm can then bend apart or together under elastic deformation.

It is possible to insert into the projections a stiffening profile which connects the two legs together. This is appropriate if the carrier profile is attached to the rail and the carrier profile is not required to have great flexibility.

As an alternative to the insertable stiffening profile, the arrangement can be such that a flap is attached like a hinge to one of the two legs which can lock into a recess of the other leg when a defined position is reached and in this position, the two legs are directly connected.

If it is desired to have a relatively rigid arm, the edges adjacent to the central strip of the carrier profile can be directly joined together.

It is also preferred if the carrier profile has a locking pin on both sides of the central strip, the edge of which can be locked into a slot-like recess of the rail under elastic deformation. The carrier profile thus configured can easily be locked to the rail in large sections.

BRIEF DESCRIPTION OF THE DRAWINGS

Embodiments of the invention will be described by way of the following drawings, in which.

Figure 2:
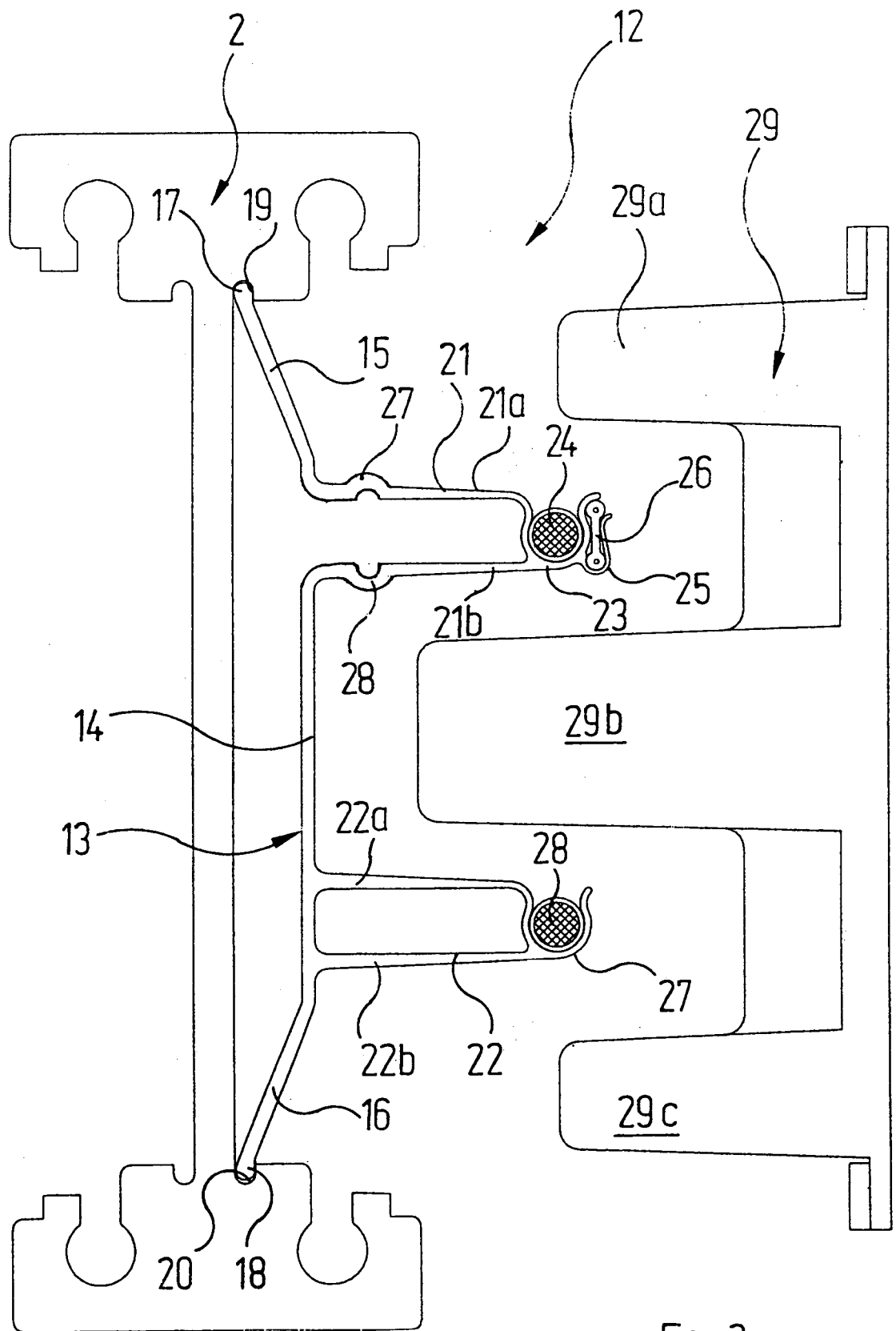
FIG. 2: shows an enlarged section through the carrier rail of the electrically powered suspended railway from FIG. 1 with a device attached for contactless energy transfer to the individual cars of the electrically powered suspended railway.
Figure 3:
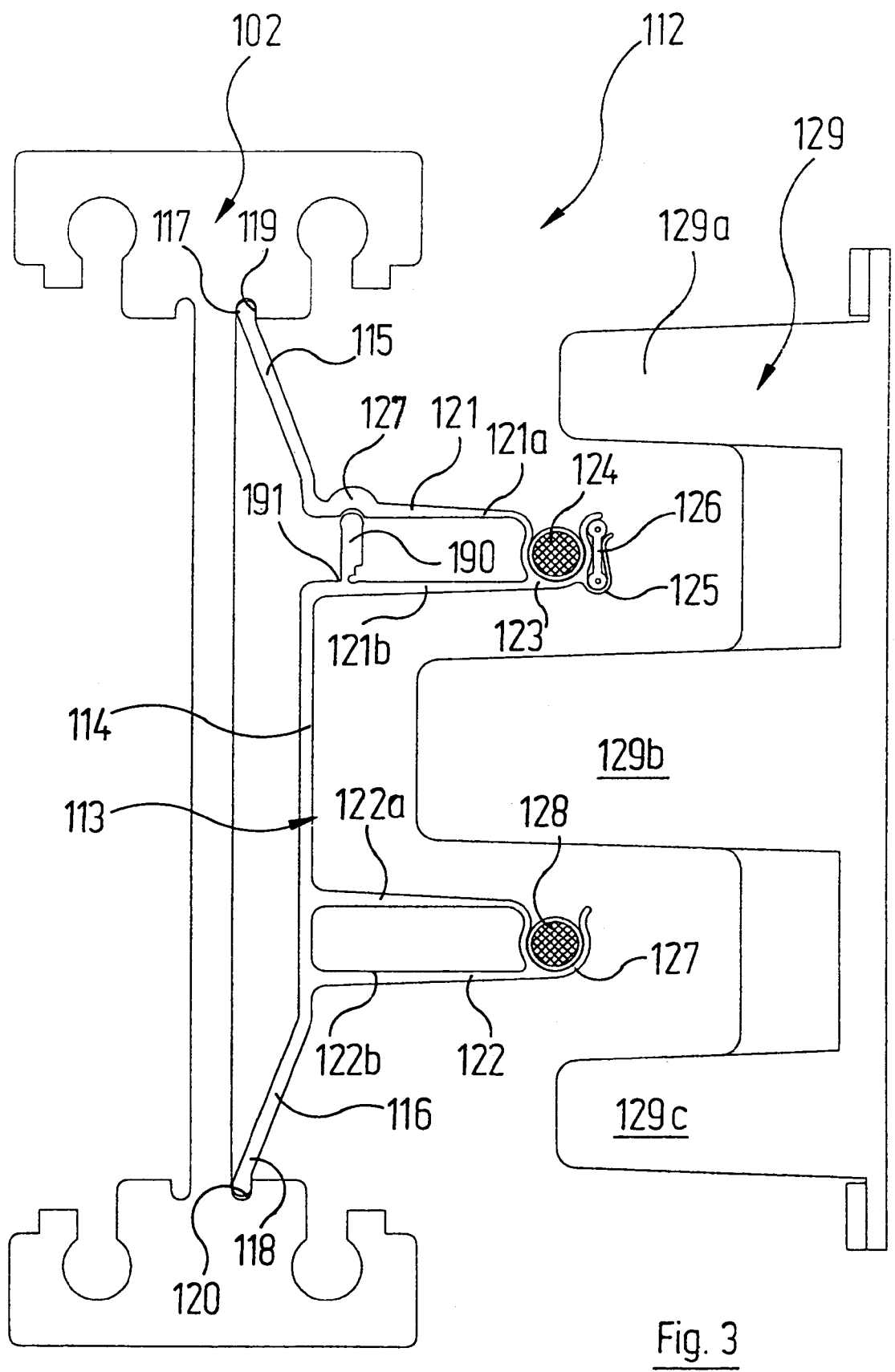

FIG. 3: shows a view similar to FIG. 2 of a second embodiment of the device in accordance with the invention.

DETAILED DESCRIPTION OF THE PREFERRED EMBODIMENT

Figure 1:
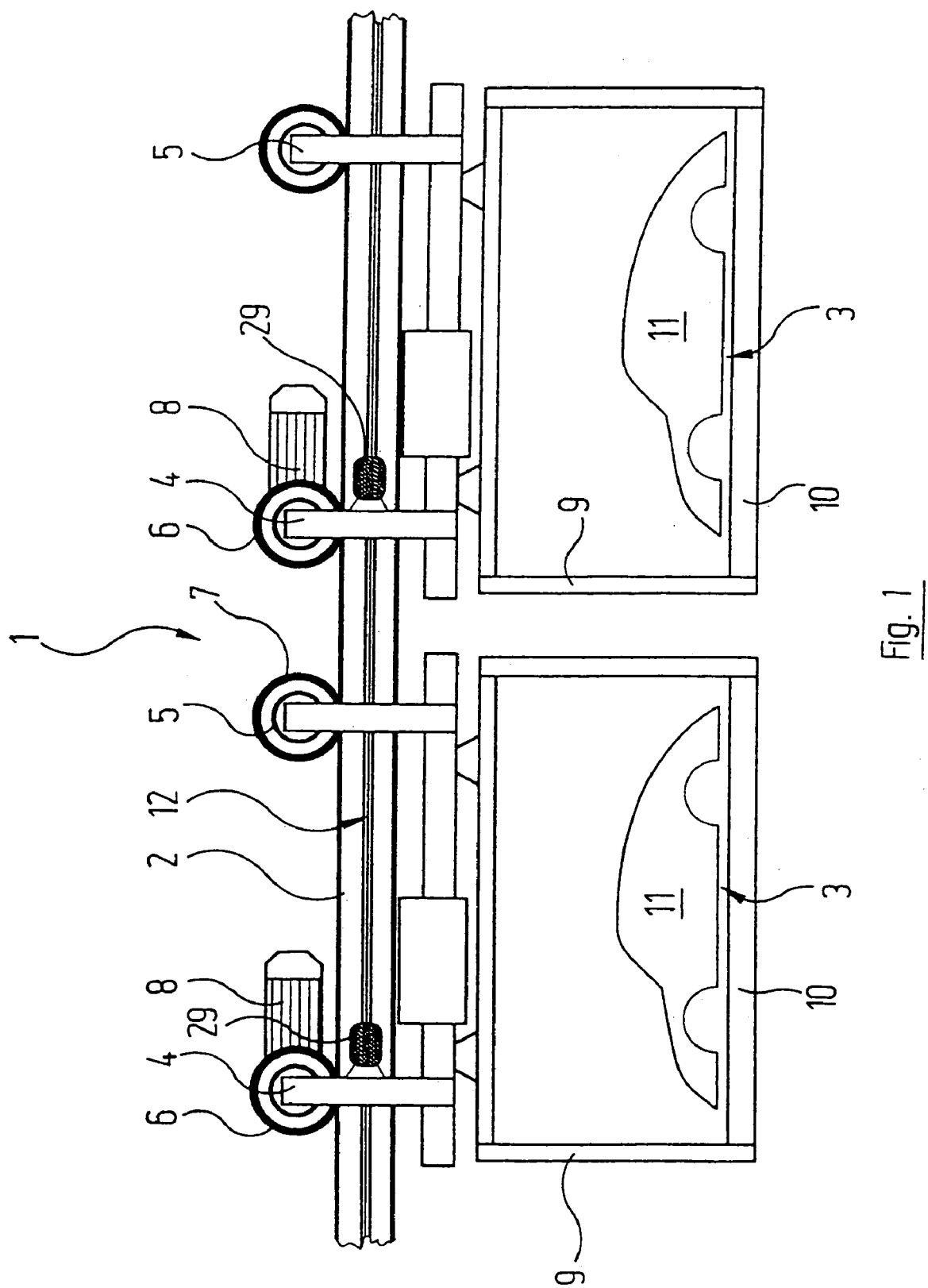
FIG. 1: shows a section from an electrically powered suspended railway for transporting vehicle bodies.

FIG. 1 shows a section through an electrically powered suspended railway overall with a reference 1. The electrically powered suspended rail system 1 comprises a carrier rail 2, for example held above the floor by a steel construction, on which a number of cars 3 can be driven. Each car 3 has two drive units 4, 5 with wheels 6, 7 which roll along the upper side of the carrier rail 2. Each of the wheels 6 of a drive unit 4 of each car 3 are driven by an electric motor 8.

From each of the drive units 4,5 on each car 3 a carrier frame 9 is suspended which has a platform 10 for the item to be transported, in the example shown a motor vehicle body 11.

Along the lateral surface of the carrier rail 2 on the observer's side there is a device for contactless transfer of electrical energy required in particular for operating the electric motors 8 which is referred to overall as 12. A more detailed description of this device 12 is given in FIG. 2. In this, a larger scale section of the carrier rail 2 of the electrically powered suspended railway 1 can be seen. The device 12 is located on the right hand side of the carrier rail 2 in FIG. 2 and comprises a plastic carrier profile referred to overall as 13. This plastic carrier profile 13 is formed as linear material and extends continuously along the lateral surface of the carrier rail 2. Individual segments of the carrier profile 13 are butted together.

The carrier profile 13 has a central strip 14 which runs approximately parallel with the lateral surface of the carrier rail 2 and onto which locking legs 15 and 16 are attached above and below. The planed of the locking legs 15, 16 run at an acute angle to the plane of the central strip 14 of the carrier profile 13. Its edges are thickened by locking beads 17, 18 which fit into corresponding recesses 19, 20 on the carrier rail 2. The distance between the recesses 19 and 20 of the carrier rail 2 and the dimensions of the carrier profile 13 are matched so that in the fixing position illustrated in FIG. 2 the carrier profile 13 is elastically deformed and thus "clicks" overall into the carrier rail 2.

The central strip 14 of the carrier profile 13 has attached to it in the upper and lower areas an arm 21, 22 which extends like a flange or rib approximately horizontally from the central strip 14 away from the carrier rail 2. The upper arm 21 has two legs 21a, 21b which are connected at their outer ends by a trough-like holder 23 for a power cable 24. In the lower area the holder 23 is restricted by a circular section surface which encloses an angle of somewhat more than 180° and whose diameter corresponds approximately to the diameter of the power cable 24. The slot-like narrowest "aperture" which leads from the inside of the holder 23 upwards thus has a width which is slightly less than the diameter of the power cable 24. The latter can thus be pressed into the inside of the holder 23 with a certain degree of elastic deformation of the holder 23 where it is held stable and precisely. It is not possible with this device 12 for the power cable 24 to hang down. Tedious manual threading operations are not required when the power cable 24 is to be laid.

A second u-section holder 25 is attached to the outer lateral surface of the holder 23 which serves to hold a bus 26 carrying data signals. The holder 25 extends just like the holder 23 for the power cable 24 and the bus 26 along the entire length of the carrier rail 2 of the electrically powered suspended rail system 1.

Both the upper leg 21a and the lower leg 21b of the carrier profile 13 each have a roughly semicircular cross-section projection 27 and 28 facing outwards. The inner edges of the arm 21, i.e. those adjacent to the central strip 14 are not joined together. The projections 27 and 28 and the fact that the inner edges of the arm 21 are not joined together facilitates the elastic deformation of the carrier profile 13 when it is locked into the recesses 19 and 20 of the carrier rail 2. When the locking process is complete a stiffening profile (not illustrated) can, if required, be inserted into the two projections 27 and 28 joining together the arms 21a, 21b.

The lower arm 22 also has an upper leg 22a and a lower leg 22b which are connected on the side pointing away from the central strip 14 by a trough like holder 27 open to the top. A second power cable 28 is also laid in the holder 27, which also extends along the full length of the carrier profile 13 perpendicular to the drawing plane of FIG. 2 and along the full length of the carrier rail 2.

The legs 22a and 22b of the lower arm 22 are substantially flat, and thus have no projections. In addition, they are joined together on their inner edges adjacent to the central strip 14 of the carrier profile 13. The lower arm 22 is thus relatively rigid as compared with the upper arm 21. However, it is possible in principle to form the lower arm 22 in the same way as the upper arm 21.

The holder 27 on the lower arm 22 does not have a further holder attached; of course, it is possible to provide here a further trough-like holder in which any energy or data carrying cable can be laid.

The energy transfer device 12, apart from the stationary part which as described above comprises the carrier profile 13 containing the electrical cables 24, 26 and 27, also has on each car 3 a transfer head 29. These transfer heads 29 as shown in FIG. 2 have a cross section that is substantially shaped like an E with three horizontal legs 29a, 29b and 29c. The central horizontal legs 29b enters between the two arms 21, 22 of the carrier profile 13, while the upper horizontal leg 29a of the transfer head 29 overlaps the first power cable 24 laid in the upper holder 23 and the lower horizontal leg 29c overlaps the second power cable 28 laid in the lower holder 27. The transfer head 29 contains passive coils in which the operating current required to drive the electric motors 8 and other electrical components of the car 3 is induced. The transfer head 29 also contains transmit and receive coils to exchange data with the data bus 26 laid in the holder 25 of the upper arm 21.

When the car 3 moves, the transfer head 29 moves along the electrical cables 24, 26 and 28 so that the geometric configuration shown in FIG. 2 is retained.

The embodiment of the invention illustrated in FIG. 3 differs from that in FIG. 2 only in the detailed configuration of the upper arm 121. Its lower leg 121b does not have any projection; instead, a flap 190 is connected through a flexible hinge 191 to its inner side pointing towards the upper leg 121a. This can be moved between the position shown in the illustration in which it joins together the two legs 121a, 121b, locks into the projection 127 of the upper leg 121a and stiffens the arm 121, and a second position, in which it stands at an acute angle to the lower leg 121b and gives the arm 121 greater flexibility.

What is claimed is:

1. A device for contactless transfer of electrical energy from at least one power cable carrying electrical energy which is laid along a stationary rail of a transport system to a moving element that can be driven along the rail, which element has a transfer head which works inductively with the power cable, comprising: at least one carrier element fixed in a releasable manner to the rail, said carrier element having a snap-lock connection and a holder for the power cable, wherein the carrier element is a carrier profile extending substantially along the entire rail which has at least one trough-like holder open to the side in which a data cable is laid, wherein the carrier profile is elastically deformable and is fixed at the carrier rail by the snap-lock connection provided by the elastic deformability of the carrier profile, and further comprising stiffening means for reducing the elastic deformability of the carrier profile when the carrier profile is fixed at the carrier rail for preventing a dislodge of the carrier profile from the carrier rail.

2. A device according to claim 1, wherein the carrier profile has two parallel power cable holders in which a power cable is laid in each of the cable holders.

3. A device according to claim 1, wherein the power cable holder is arranged at the end of an arm which extend away from a central strip of the carrier profile.

4. A device according to claim 3, wherein the edges of an arm adjacent to the central strip of the carrier profile are directly joined together.

5. A device according to claim 1, wherein the rail has a slot-like recess formed therein and the carrier profile on both sides of the central strip has a locking leg, the edge of which under elastic deformation can be locked into the slot-like recess on the rail.

6. A device according to claim 3, wherein the arm has two parallel legs which are joined together by the power cable holder on their edges pointing away from the central strip.

7. A device according to claim 6, wherein the legs of an arm have projections running parallel to the longitudinal axis of the carrier profile.

8. A device according to claim 7, wherein the edges of an arm adjacent to the central strip of the carrier profile are not directly joined together.

9. A device according to claim 8, wherein a stiffening profile joining the two legs can be inserted into the projections.

10. A device for contactless transfer of electrical energy from at least one power cable carrying electrical energy which is laid along a stationary rail of a transport system to a moving element tat can be driven along the rail, which element has a transfer head which works inductively with the power cable comprising at least one carrier element fixed in a releasable manner to the rail, which element has a holder for the power cable, wherein the carrier element is a carrier profile extending substantially along the entire rail which has at least one trough-like holder open to the side in which a data cable is laid, wherein the power cable holder is arranged at the end of an arm which extend away from a central strip of the carrier profile, and the arm has two parallel legs which are joined together by the power cable holder on their edges pointing away from the central strip, and the legs of an arm have projections running parallel to the longitudinal axis of the carrier profile, and the edges of an arm adjacent to the central strip of the carrier profile are not directly joined together, wherein on one of the two legs a flap is attached like a hinge which in a certain position can be locked into a projection of the other leg and in this position joins the two legs together.

11. A device for contactless transfer of electrical energy from at least one power cable carrying electrical energy which is laid along a stationary rail of a transport system to a moving element that can be driven along the rail, which element has a transfer head which works inductively with the power cable comprising at least one carrier element fixed in a releasable manner to the rail, which element has a holder for the power cable, wherein the carrier element is a carrier profile extending substantially along the entire rail which has at least one trough-like holder open to the side in which a data cable is laid, wherein the power cable holder is arranged at the end of an arm which extend away from a central strip of the carrier profile, and the arm has two parallel legs which are joined together by the power cable holder on their edges pointing away from the central strip, and the edges of an arm adjacent to the central strip of the carrier profile are not directly joined together, wherein on one of the two legs a flap is attached like a hinge which in a certain position can be locked into a projection of the other leg and in this position joins the two legs together.

* * * * *